US011578883B2

(12) United States Patent
Song

(10) Patent No.: US 11,578,883 B2
(45) Date of Patent: Feb. 14, 2023

(54) AIR-RELEASE OPENINGS AND MIST-RELEASE OPENINGS FOR ULTRASONIC ATOMIZER AND ULTRASONIC ATOMIZERS HAVING THE SAME

(71) Applicant: Zhihui Song, DongGuan (CN)

(72) Inventor: Zhihui Song, DongGuan (CN)

( * ) Notice: Subject to any disclaimer, the term of this patent is extended or adjusted under 35 U.S.C. 154(b) by 97 days.

(21) Appl. No.: 17/321,364

(22) Filed: May 14, 2021

(65) Prior Publication Data

US 2022/0364745 A1 Nov. 17, 2022

(51) Int. Cl.
*F24F 6/14* (2006.01)
*F24F 6/00* (2006.01)

(52) U.S. Cl.
CPC .......... *F24F 6/14* (2013.01); *F24F 2006/008* (2013.01)

(58) Field of Classification Search
CPC ........... F24F 6/12; F24F 6/14; F24F 2006/008
USPC ............................................. 261/81, DIG. 48
See application file for complete search history.

(56) References Cited

U.S. PATENT DOCUMENTS 5,322,646 A * 6/1994 Wright ...................... F24F 6/12
261/79.2
9,797,612 B2 * 10/2017 Staniforth ............... F24F 13/26
10,092,874 B2 * 10/2018 Bae ........................ B01D 47/16
10,330,332 B2 * 6/2019 Seo .......................... F24F 6/12

FOREIGN PATENT DOCUMENTS

DE 102006014734 A1 * 10/2007

* cited by examiner

*Primary Examiner* — Charles S Bushey
(74) *Attorney, Agent, or Firm* — Intellectual Property Law Group LLP

(57) ABSTRACT

A plurality of air-releasing openings with inclined sidewalls are arranged at the periphery of the water tank of an aroma diffuser product, each air-release opening disposed in a position that is set at a certain angle along the inclined direction of the sidewalls. The certain angle being formed by the center longitudinal axis of the exit side of the opening relative to the radius of the water tank. A plurality of mist-releasing openings is arranged non-horizontally at the upper part of the water tank or the periphery of the water tank cover. An aroma diffuser or ultrasonic atomizer configured with the plurality of air-releasing openings and/or the plurality of mist-releasing openings.

20 Claims, 11 Drawing Sheets

AIR-RELEASE OPENINGS AND MIST-RELEASE OPENINGS FOR ULTRASONIC ATOMIZER AND ULTRASONIC ATOMIZERS HAVING THE SAME

FIELD

The exemplary embodiment(s) of the present invention relates to the field of ultrasonic atomizer products. More specifically, the exemplary embodiment(s) of the present invention relates to air-releasing and mist-releasing openings, particularly used in aromatherapy diffusers.

BACKGROUND

The production and sales of ultrasonic atomizing devices are growing rapidly. Small ultrasonic atomizing products are also known as aroma/aromatherapy diffusers. After adding a few drops of essential oil to the water in the water tank, the ultrasonic atomizing plate atomizes the water and essential oil into a mist. The airflow from the air outlet blows the mist from the mist outlet to diffuse the aroma.

In recent years, aroma diffusers with special visual effects have been favored by the market, such as aroma diffusers with color LED lights, Bluetooth audio functions, or glass or ceramic housings.

Therefore, atomizers with special visual effects are needed on the market to meet the preferences and needs of users.

SUMMARY

The presently claimed invention relates to the field of ultrasonic atomizer products and is particularly applied to aroma diffuser products. Embodiments of the present invention comprise a special air-releasing opening and mist-releasing opening design, that when used in aroma diffusers, can form upward spiral airflow in the cavity of an aroma diffuser type product. As a result, the mist generated by the ultrasonic atomizing plate, along with the spiral airflow, forms a visual effect of swirling fog and mist.

According to an embodiment of the present invention, several air-releasing openings are arranged around the middle or lower periphery of the water tank of a diffuser product. In particular, the whole or part of the sidewalls of the air-releasing openings are inclined, so that part of the airflow blown from the fan at the bottom of the water tank passes through the air-releasing openings and forms a clockwise or counterclockwise upward spiral airflow around the center of the water tank. More specifically, the air-releasing openings arranged on the periphery of the water tank are in a position that is rotated/angled at a certain angle along the inclined direction of the sidewall, so that the upward spiral airflow converges toward the center. These air-releasing openings can be rectangular, polygonal, circular, or oval.

According to an embodiment of the present invention, several mist-releasing openings are arranged at the periphery of the water tank cover or on the periphery of the upper part of the water tank of an aroma diffuser type product. Part of the airflow generated by the fan under the water tank enters the water tank and blows the mist generated by the ultrasonic atomizing plate out of the water tank through the mist-releasing openings. The mist merges with the above-mentioned upward spiral airflow. In particular, rather than one single mist-releasing opening, there is a plurality of mist-releasing openings. In addition, these mist-releasing openings are at a certain angle with the horizontal plane. That way, when the mist passes through these mist-releasing openings and part of the water mist is condensed, the resulting small droplets will not block the mist-releasing openings. These mist-releasing opening can be rectangular, polygonal, circular, or oval.

Other embodiments of the present invention include aroma diffusers or ultrasonic atomizer products incorporating the presently claimed one or more air-releasing openings and/or mist-releasing openings.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
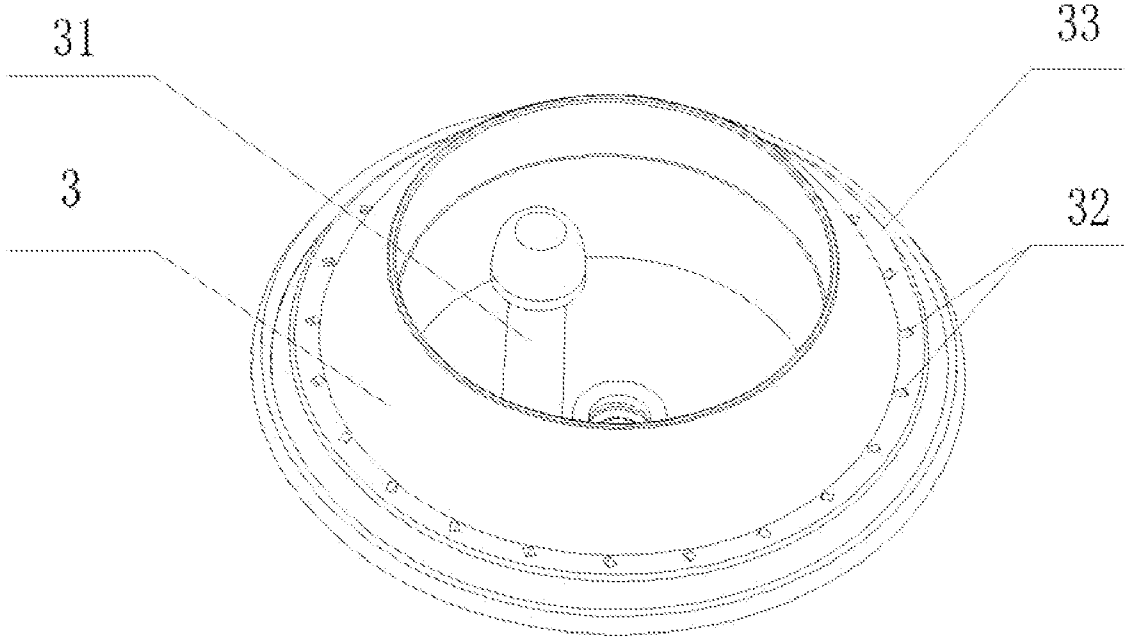
FIG. 1 is a perspective view of an aroma diffuser water tank illustrating air-releasing openings distributed around the bottom of the water tank, according to an embodiment of the present invention.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

In order to solve the above-mentioned problems, one embodiment of the present invention discloses a special air-releasing opening and mist-releasing opening design. The specially designed air-releasing opening and mist-releasing opening can be applied to aroma diffuser products/ultrasonic atomizer products, which can generate a spiral airflow converging toward the center. Thus, the water mist generated by the ultrasonic atomizing plate in the product forms a visual effect of swirling fog and mist.

The following is a detailed description of the present disclosure, with reference to the Figures of the accompanying drawings. It is noted that aroma diffuser, aromatherapy diffuser, and ultrasonic atomizer/ultrasonic diffuser may be used interchangeably. Reference to air-release/air-releasing openings, may be referred to as air outlets, air holes or air vents; similarly mist-release/mist-releasing openings may be referred to as mist outlets, mist holes or mist vents.

The presently claimed invention discloses special air-releasing openings 32 that are distributed in the middle or lower periphery of the water tank 3 of an ultrasonic atomizer product, according to embodiments of the present invention. FIG. 1 is a perspective diagram illustrating a plurality of air-releasing openings 32 distributed around the bottom of a water tank 3 of a particular aroma diffuser, in accordance with an embodiment of the present invention. The air-releasing openings 32 are particularly shown distributed along a peripheral rim or flange 33 of the bottom of the water tank 3. In an embodiment, the peripheral rim is substantially horizontal.

Figure 2:
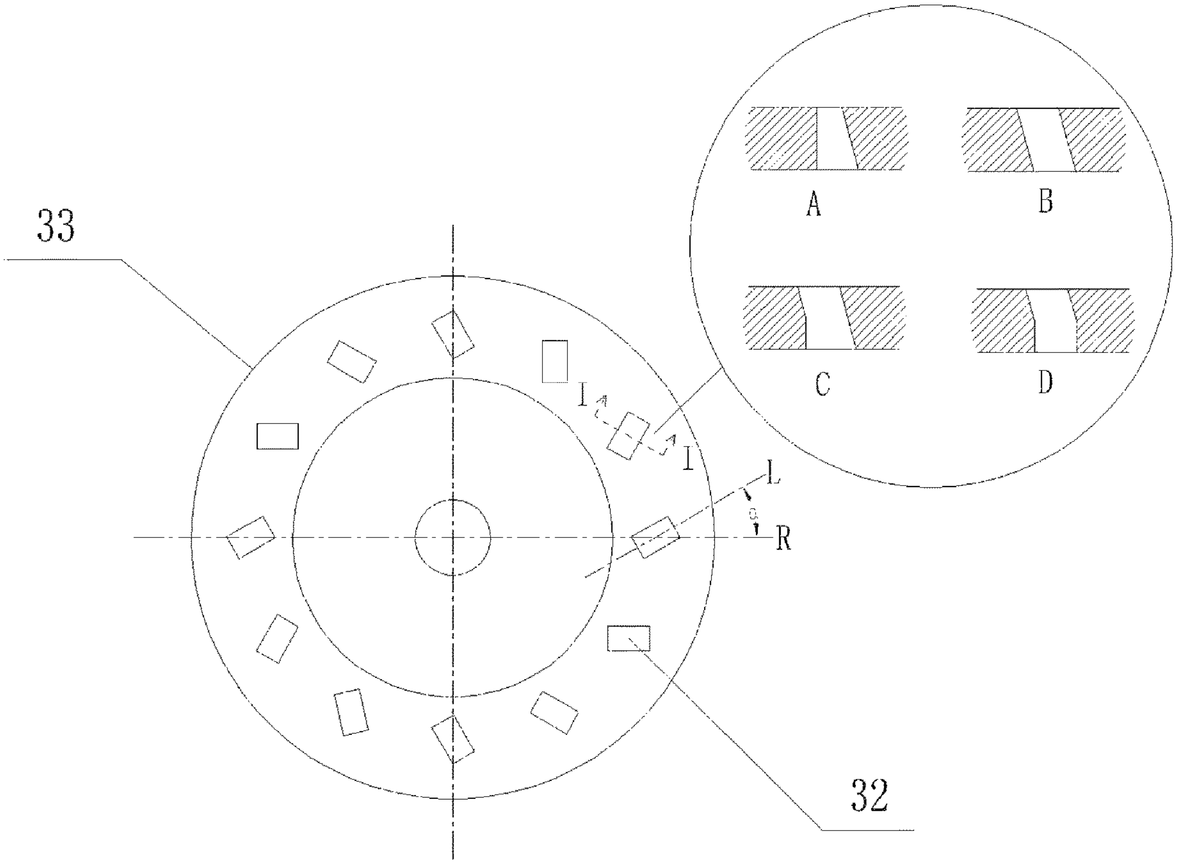
FIG. 2 is a plan view of an aroma diffuser water tank illustrating an embodiment of air-releasing opening that generate a counterclockwise rotating airflow and a cross-section detail view taken along section I-I of one of the air-releasing openings illustrating cross-sections of four differently angled air-releasing openings, according to embodiments of the present invention.

FIG. 2 illustrates a plan view of a plurality of air-releasing openings 32 along a rim 33 that generate counterclockwise rotating airflow, according to an embodiment of the present invention. These air-releasing openings 32, running through the thickness of the rim 33, are characterized in that their two opposing sidewalls along the lengthwise direction (i.e. sidewalls/perimeter walls when viewed in cross-section in the direction of the cutting plane line, section I-I) are all or partly inclined. To generate the counterclockwise rotating airflow, the incline is from the right inclining to left when looking from the direction of section line I-I (the depth view of the air-release opening). In other words, one or both of the opposing sidewalls are entirely or partly inclined in a direction of incline from a lower entry side toward an upper exit of the air-release opening.

The detail view of one of the air-releasing openings 32 shows cross-sectional views taken along the I-I line in FIG. 2, particularly detailing four kinds of air-release openings with inclined sidewalls, according to embodiments of the present invention. Type A in FIG. 2 shows an air-releasing opening having one vertical sidewall with the opposite side wall being inclined. Type B in FIG. 2 shows an air-releasing opening having both opposing sidewalls being inclined. Type C in FIG. 2 shows an air-releasing opening having one inclined sidewall and the opposite sidewall comprised of a lower vertical part and an upper inclined part. Type D in FIG. 2 shows an air-releasing opening with both opposing sidewalls having vertical parts and inclined parts, for example, the upper part of the opening being inclined and the lower part of the opening being vertical.

From the inclined direction of the sidewall(s) of each of these air-releasing openings 32 in FIG. 2, it can be seen that the airflow blown by the fan (see FIG. 11 for the fan 2) at the bottom of the water tank 3 can form a counterclockwise spiral airflow around the center of the water tank 3 after passing through these air-releasing openings 32 which are distributed at the periphery of the water tank 3.

In order to make the spiral airflow converge towards the center, these air-releasing openings 32 are arranged in a certain way along the rim or flange 33 of the water tank 3. As illustrated in FIG. 2, the position of air-releasing openings 32 are determined by the following methods. The center longitudinal axis (L) of the rectangular exit of an air-releasing opening 32, and the radial line (R) of the rim 33 that passes through the center point of the rectangular exit of the opening 32 form an angle "a" having a value ranging between 10 and 60 degrees and preferably, 30 degrees, according to an embodiment of the invention. In other words, this angle "a" is determined by rotating the center longitudinal axis (L) of the exit of the air-releasing opening 32 counterclockwise from the radial line (R) of the rim 33.

Figure 3:
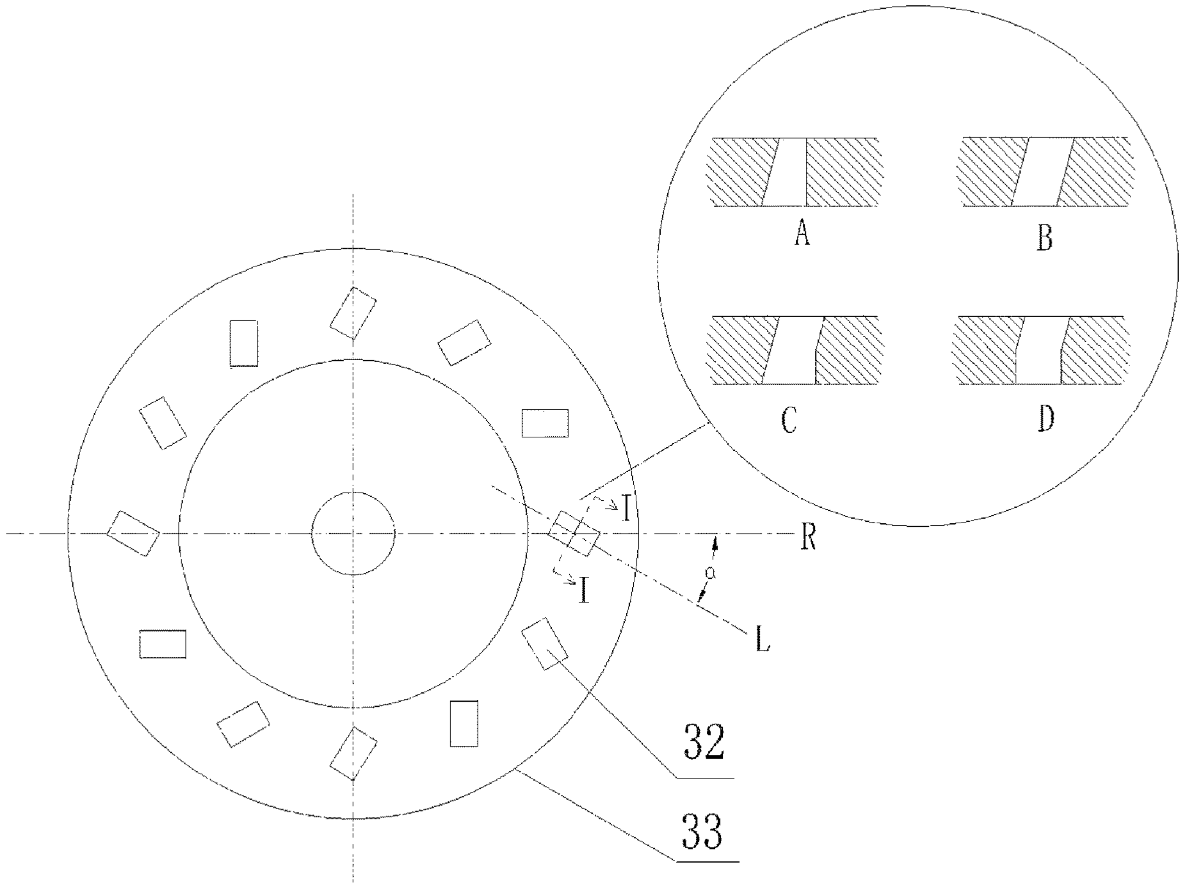
FIG. 3 is a plan view of an aroma diffuser water tank illustrating an embodiment of air-releasing openings that generate clockwise rotating airflow and a cross-section detail view taken along section I-I of one of the air-releasing openings illustrating cross-sections of four differently angled air releasing openings, according to embodiments of the present invention.

FIG. 3 is an example of a set of air-releasing openings 32 along a rim 33 capable of forming a clockwise spiral airflow converging toward the center, according to an embodiment of the present invention. Air-releasing openings 32 in FIG. 3 are the same as air-releasing openings 32 in FIG. 2 in terms of shape, size, and quantity. There are two differences that make the airflow from the air-releasing openings 32 in FIG. 3 rotate clockwise and converge to the center, instead of rotate counterclockwise and converge to the center as does the airflow from the air-releasing openings 32 in FIG. 2. The first difference is that the angle "a" between the center longitudinal axis (L) of the rectangular exit of opening 32 and the radial line (R) of the rim or flange 33 passing through the center point of the rectangular exit of opening 32 is formed by rotating the center longitudinal axis (L) clockwise from the radial line (R). This way, the airflow from these air-releasing openings 32 rotates clockwise. The second difference is that the incline of the sidewalls of air-releasing openings 32 is from the left inclining to the right when viewed in the direction of the cutting plane line, section I-I (depth view). Therefore, the airflow converges to the center instead of diverging to reach and blur the transparent outer cover 6. To generate the clockwise rotating airflow, the sidewalls/perimeter walls of the air-releasing openings 32 are entirely or partly inclined from the left inclining to the right. The detail view of one of the air-releasing openings 32 shows cross-sectional views taken along the I-I line, showing four kinds of air-releasing openings with clockwise inclined sidewalls, according to embodiments of the present invention.

The air-releasing openings 32 in FIG. 2 and FIG. 3 are rectangular in shape, however, these air-releasing openings can also be designed to be polygonal, circular, or oval. The air-releasing openings may be evenly or unevenly spaced from one another or grouped in different configurations. It is noted that the rim or flange 33 is formed with the air-releasing openings 32 positioned in a set configuration and direction, according to embodiments of the present invention. For example, the air-release openings may be formed by casting or drilling into the rim 33 during manufacture of the water tank 3.

Figure 4:
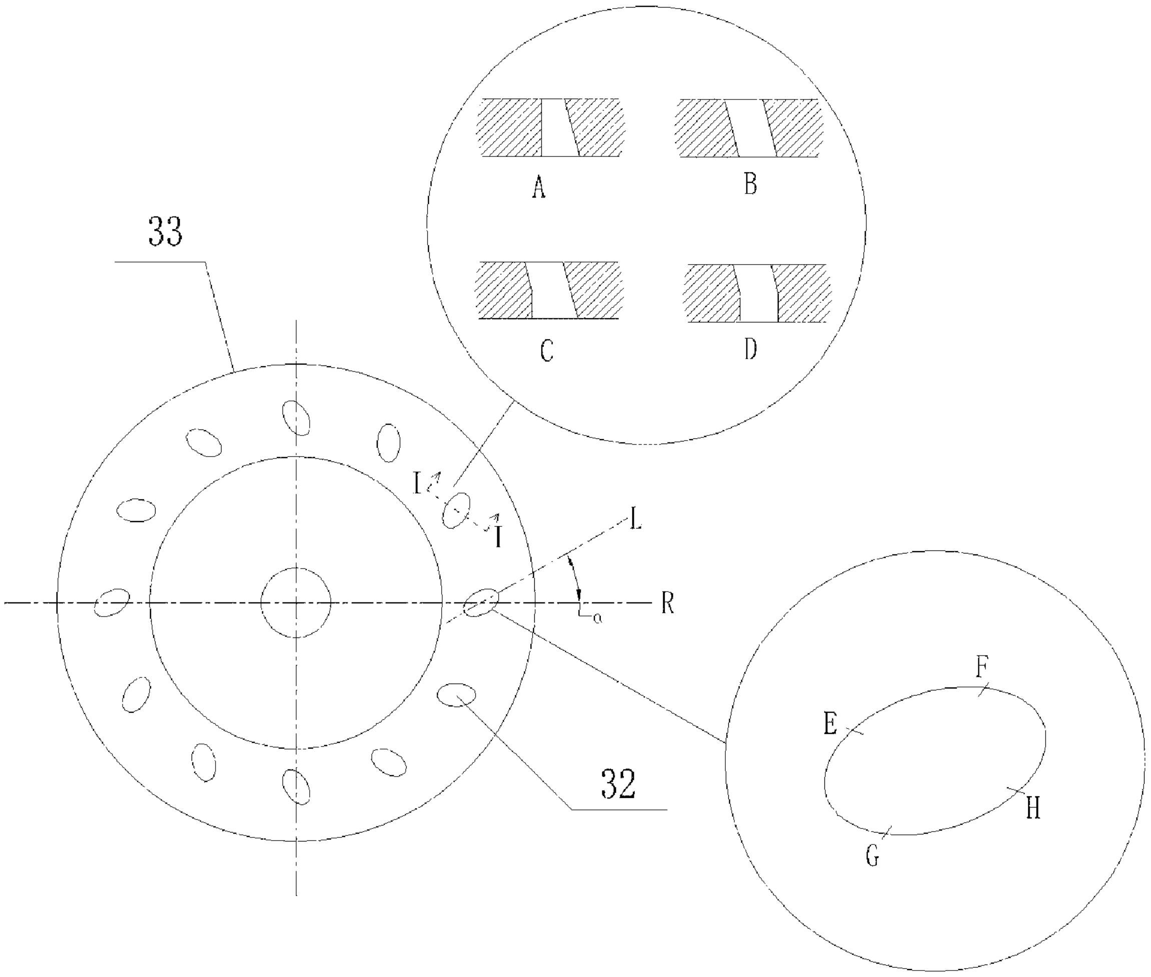
FIG. 4 is a plan view of an aroma diffuser water tank that shows an embodiment of oval air-releasing openings that generate counterclockwise rotating airflow.

FIG. 4 is an example of oval air-releasing openings 32 along a rim 33, which can form a counterclockwise spiral airflow converging toward the center, according to another embodiment of the present invention. When the exit of an air-releasing opening 32 is an oval shape, the perimeter side walls of two opposing long arcs are partially or fully inclined. (See long arc EF opposing long arc GH in the enlarged detail plan view of an oval shaped air-releasing opening 32). The position of the air-releasing opening 32 can be determined as following. The center longitudinal axis (L) of the oval shaped exit of the air-releasing opening 32 and the radial line (R) of the rim 33 that passes through the center point of the oval should form an angle "a" having a value ranging between 10 and 60 degrees and preferably, 30 degrees, according to an embodiment of the invention. The cross-sectional views taken along a cut line through the minor axis of the oval-shaped air-releasing openings 32 appears the same as those of the rectangular shaped air-releasing openings 32 shown in FIG. 2 and FIG. 3.

Figure 5:
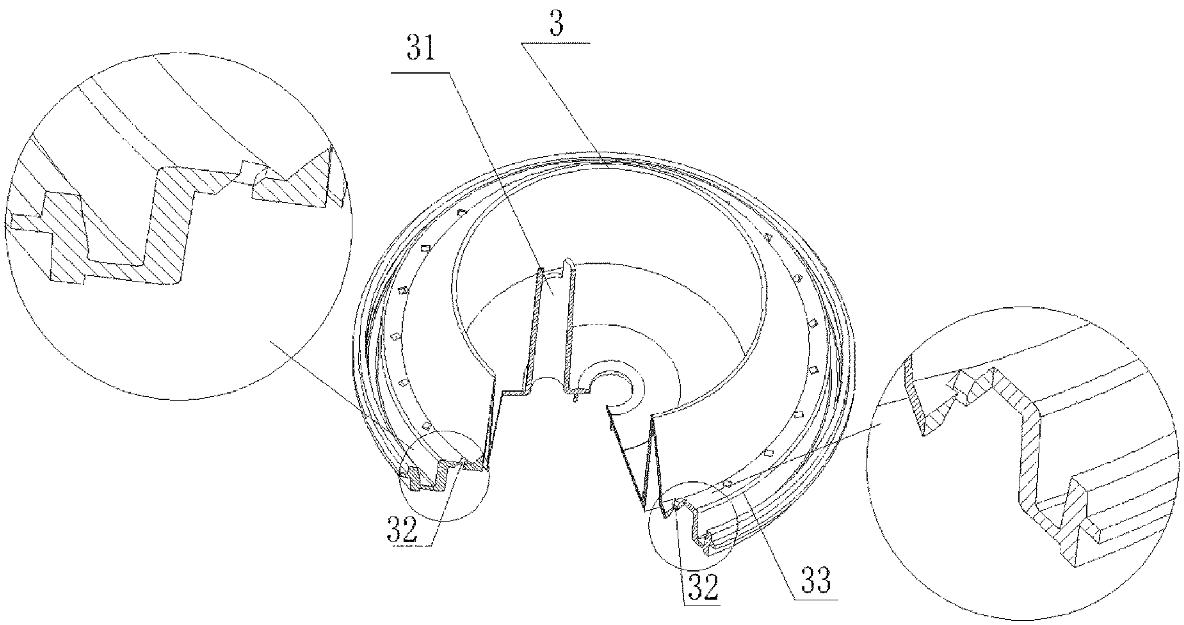
FIG. 5 is a perspective section view illustrating air-releasing openings distributed along a peripheral rim or flange of the bottom of the water tank. The enlarged detail views are the three-dimensional cross-sectional representation of the air-releasing opening of the C-type as shown in FIG. 2.

FIG. 5 is a perspective section view illustrating air-releasing opening 32 distributed along a peripheral rim or flange 33 of the bottom of the water tank 3. The enlarged detail views are the three-dimensional cross-sectional representation of the air-releasing opening 32 shown in FIG. 2 as the C type. That way, in this embodiment, the air coming up through these air-releasing openings 32 will form a counterclockwise spiral airflow converging toward the center.

While the detailed description to this point has focused on air-releasing openings 32, the following description discusses mist-releasing openings 41, according to embodiments of the present invention.

The presently claimed invention discloses special mist-releasing openings 41 that are distributed on the periphery of the water tank cover 4 or the periphery of the upper part of the water tank 3 of the ultrasonic atomizer product, according to embodiments of the present invention. The mist-releasing openings 41 are characterized in that the end-facing side/exit side of each of the mist-releasing openings (i.e. a plane of the outside-facing side/exit of the opening) are not arranged parallel to the horizontal plane but are situated perpendicular to the horizontal plane or form a non-zero angle with the horizontal plane. In other words, the mist-release openings 41 are disposed non-horizontally on the ultrasonic atomizer.

Figure 6:
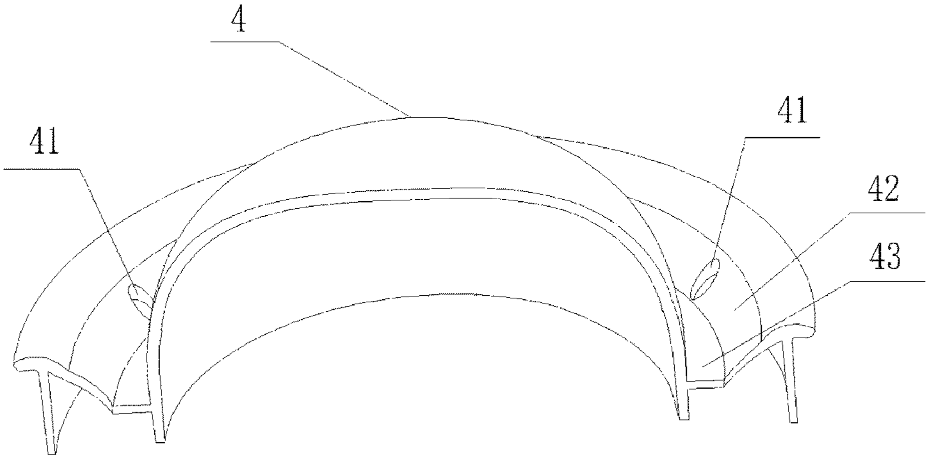
FIG. 6 is a perspective section view of a water tank cover illustrating oval mist-releasing openings distributed on the slope of the water tank cover, according to an embodiment of the present invention.

FIG. 6 is a perspective section view of a water tank cover 4 which clearly shows a plurality of oval mist-releasing openings 41 are distributed on an inclined surface 42 (i.e. surface outside the periphery 43) of the water tank cover 4, rather than on the horizontal plane (periphery 43) of the water tank cover 4 and a plane of each end/exit of a mist-release opening 41 forms an angle with the horizontal plane (i.e. the plane of the exit is non-parallel to the horizontal plane).

Figure 7:
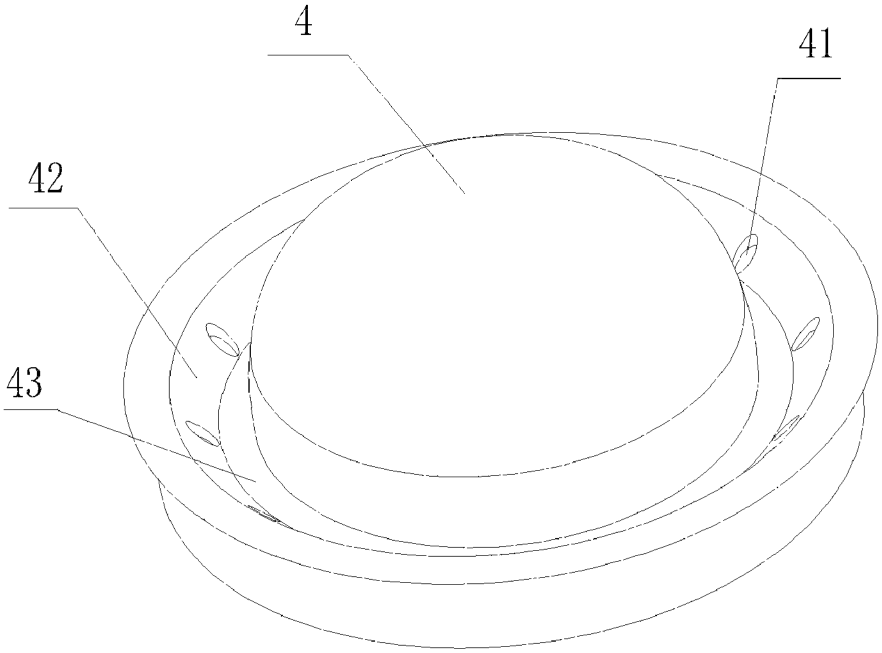
FIG. 7 is a perspective view of a water tank cover showing oval mist-releasing openings distributed on the slope of the water tank cover, according to an embodiment of the present invention.

FIG. 7 is a perspective view showing the overall arrangement of the oval mist-releasing openings 41 distributed on the peripheral slope 42 (inclined surface) of the water tank cover 4, located on the outside of the periphery 43. The periphery 43 of the water tank cover 4 may comprise a substantially flat area or include a portion that is substantially aligned with the horizontal plane, according to embodiments of the present invention.

Figure 8:
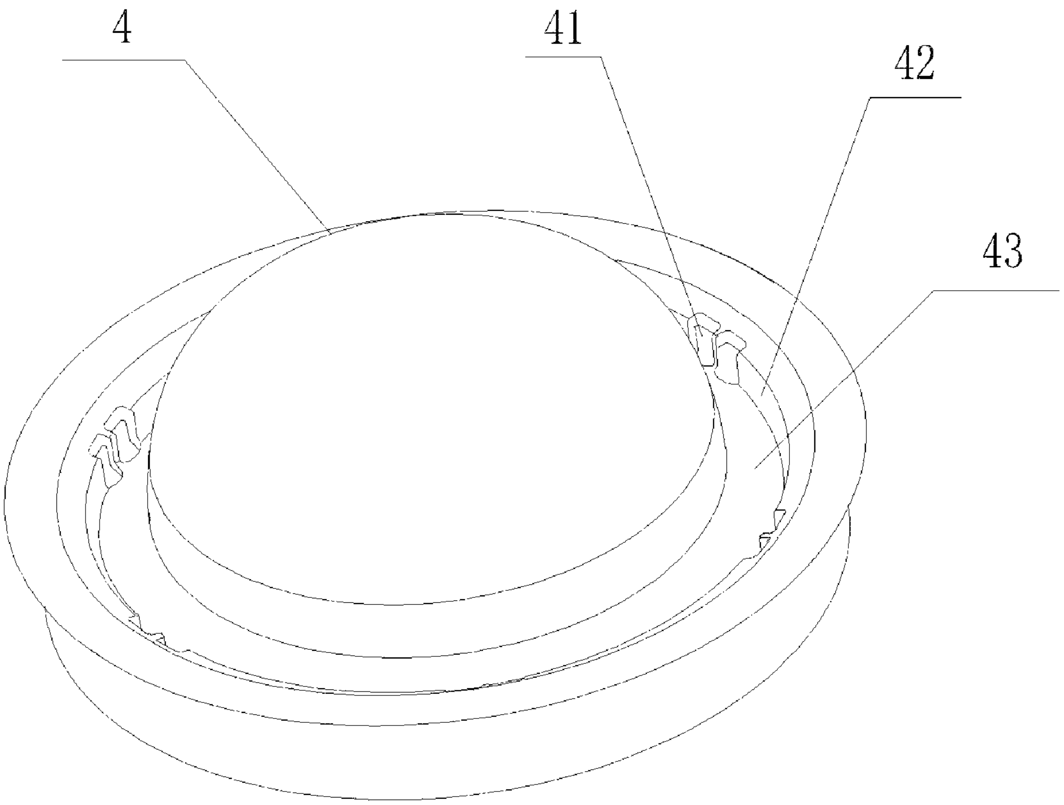
FIG. 8 is a perspective view of a water tank cover showing rectangular mist-releasing openings distributed on the vertical surface outside the water tank cover, according to an embodiment of the present invention.

FIG. 8 is a perspective view showing the overall arrangement of the rectangular mist-releasing openings 41 distributed on a vertical surface 42 outside the periphery 43 of the water tank cover 4, in accordance with an embodiment of the present invention. The vertical surface 42 outside the periphery 43 of the water tank cover 4, may be referred to as an outer vertical surface 42. As shown, the periphery 43 of the water tank cover 4 includes the surface which meets the bottom of the of the mist-release openings 41.

Figure 9:
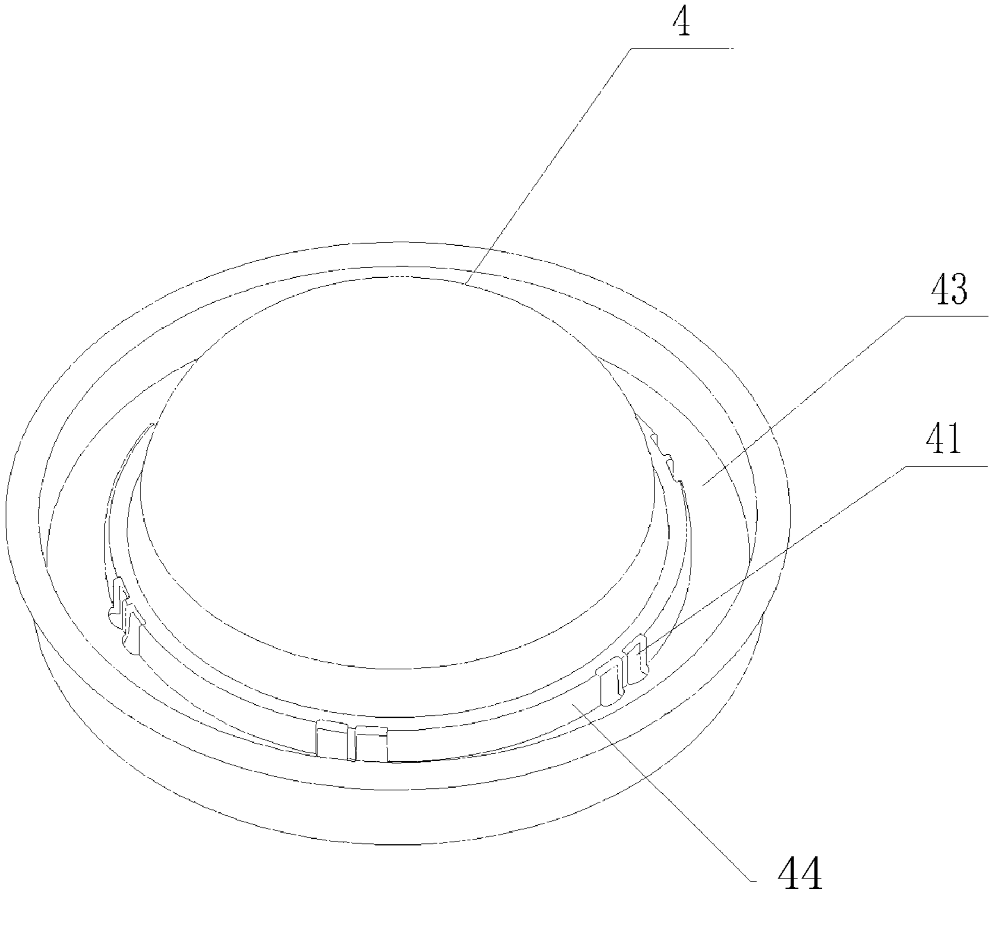
FIG. 9 is a perspective view of another water tank cover showing rectangular mist-releasing openings distributed on the vertical surface inside the water tank cover, according to an embodiment of the present invention.

FIG. 9 is a perspective view showing the overall arrangement of the rectangular mist-releasing openings 41 distributed on a vertical surface 44 inside the periphery 43 of the water tank cover 4, in accordance with an embodiment of the present invention. The vertical surface 44 inside/inward of the periphery 43 of the water tank cover 4, may be referred to as an inner vertical surface 44. In another embodiment, the inner vertical surface 44 may instead be formed as a sloped surface inside the periphery 43 of the water tank cover 4. For example inner surface 44 may incline upward from the periphery toward the center of the water tank cover 4.

These mist-releasing openings 41 can also be designed to be polygonal, elliptical or circular. The mist-releasing openings 41 may be evenly or unevenly spaced from one another or grouped in different configurations.

Figure 10:
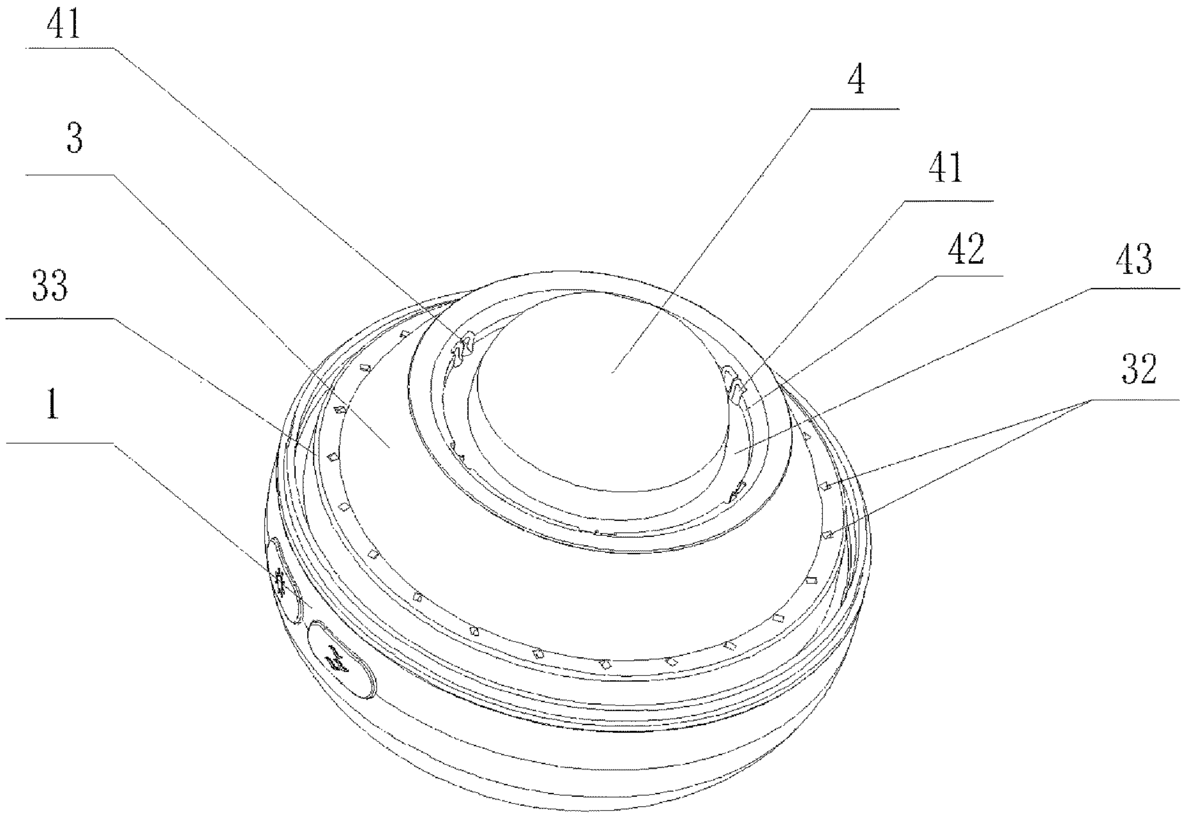
FIG. 10 is a perspective view showing the assembly of the bottom shell, water tank with air-releasing openings, and water tank cover with mist-releasing openings, according to an embodiment of the present invention.

FIG. 10 is a perspective view of the assembly of one of the embodiments of the present invention, including bottom shell 1, water tank 3, and water tank cover 4. It clearly shows the arrangement and distribution of the specially designed air-releasing openings 32 and mist-releasing openings 41.

Figure 11:
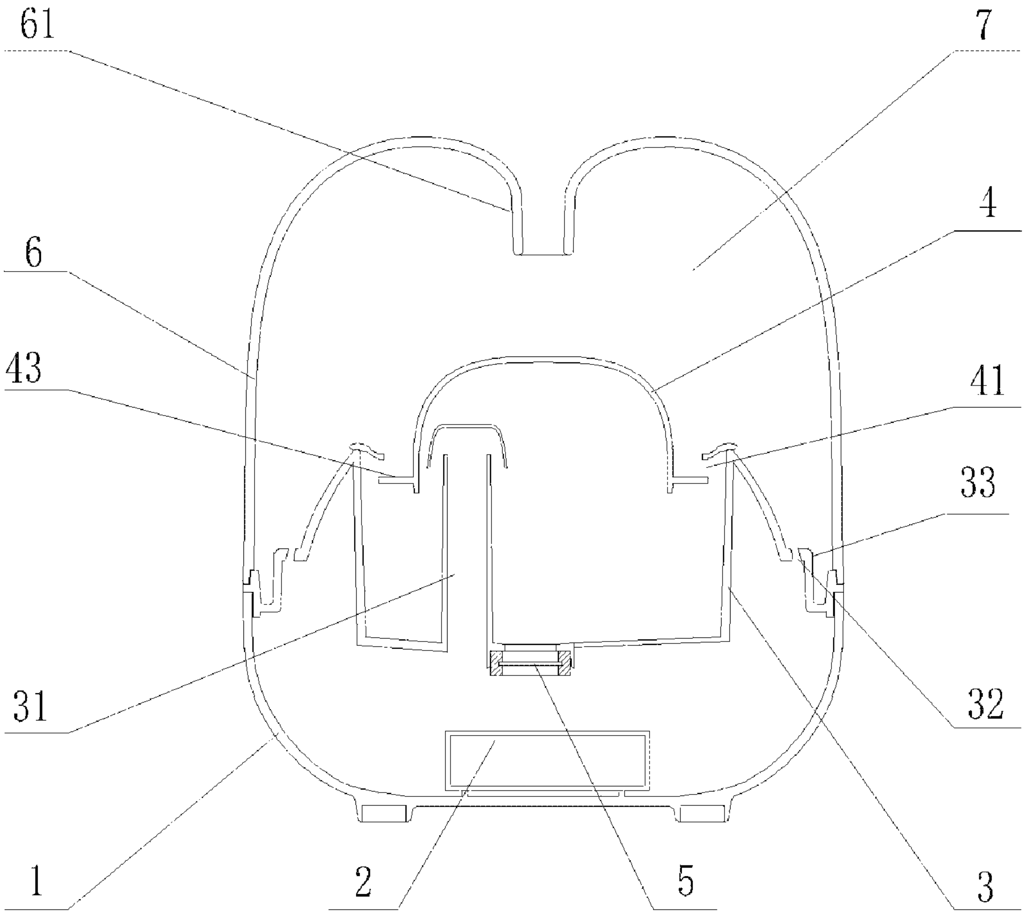
FIG. 11 is a cross-sectional structural diagram of an aroma diffuser which shows specific implementation instructions for special air-releasing openings and mist-releasing openings, illustrating the overall workflow of generating the visual effect of swirling fog and mist in aroma diffuser products, according to an embodiment of the present invention.
Figure 12:
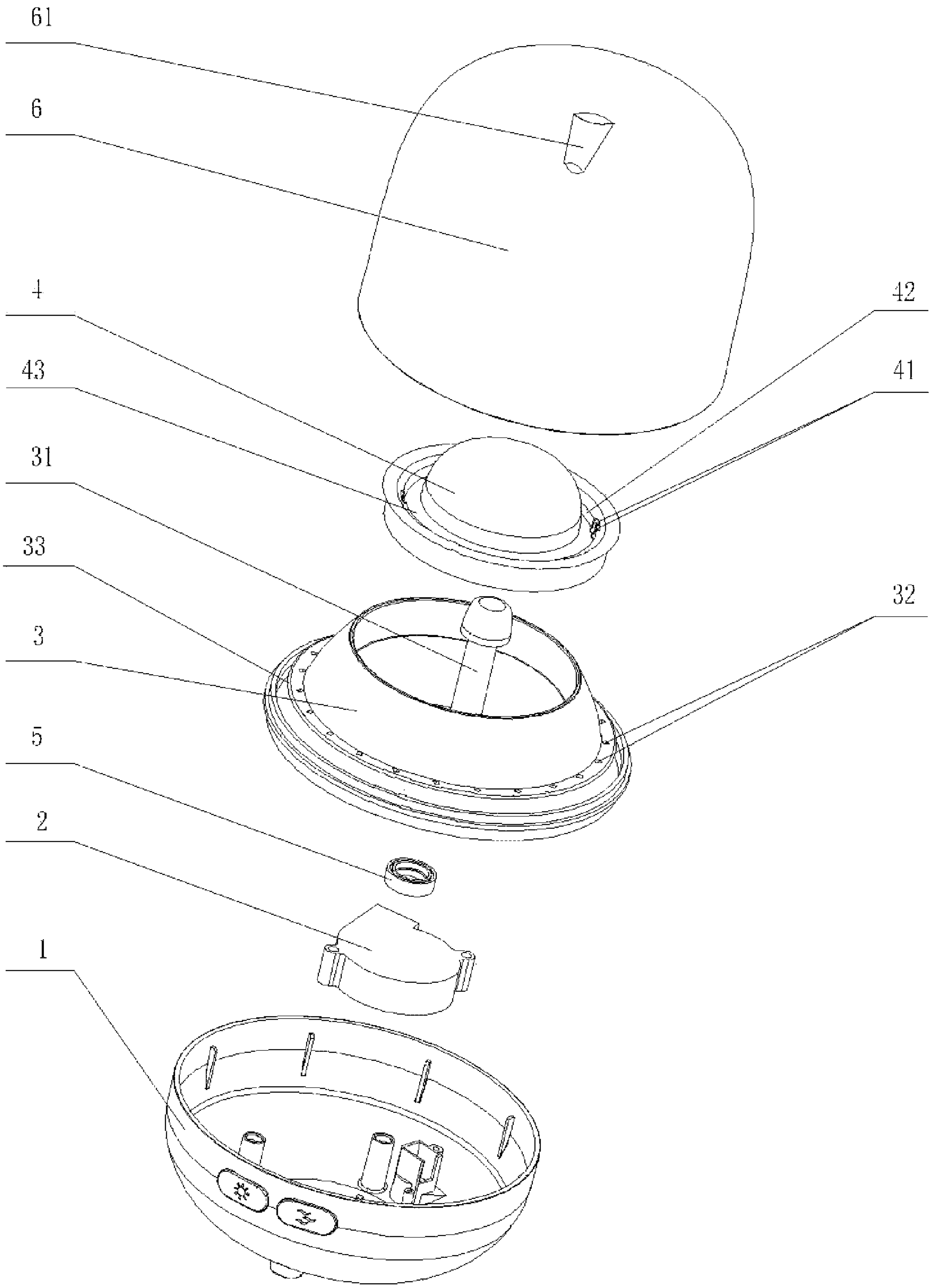
FIG. 12 is an exploded perspective view of the aroma diffuser as shown in FIG. 11, according to an embodiment of the invention.

FIG. 11 is a cross-sectional structural schematic diagram and FIG. 12 is an exploded view of the assembly of a general aroma diffuser/ultrasonic atomizer, according to an embodiment of the present invention. The diffuser workflow comprises the following: the ultrasonic atomizing plate 5 atomizes the water in the water tank 3 into water mist that can float (i.e. aerosolized). The airflow generated by fan 2 passes through the inner air outlet 31 of the water tank 3 to the inside of the water tank 3 and passes through mist-releasing openings 41 on the water tank cover 4. The water mist is blown into cavity 7 which is formed by the water tank 3, the water tank cover 4, and the transparent outer cover 6; and then passes through the mist outlet 61 above the transparent outer cover 6 to the outside.

In accordance with embodiments of the present invention, an aroma diffuser/ultrasonic atomizer may be configured with a plurality of air-releasing openings 32 and/or a plurality of mist-releasing openings 41.

The air-releasing openings 32 disclosed in embodiments of the present invention are distributed around the lower periphery of the water tank 3, and part of the air flow generated by the fan 2 will enter the transparent cavity 7 through these air-releasing openings 32. Since the sidewalls of the air-releasing openings 32 are inclined, the airflow entering the transparent cavity 7 rotates counterclockwise or clockwise. Moreover, the exits of the air-releasing openings 32 are arranged at a certain angle along the same direction (either counterclockwise or clockwise) and consistent with the inclined direction of the sidewalls, so the rotating airflow from these air-releasing openings 32 converges toward the center.

In the upward process, these spiral airflows mix with the visible water mist blown from the mist-releasing openings 41 to form a swirling fog and mist visual effect, which surges upward and blows out from the mist outlet 61. Since the water mist converges and rotates towards the center, it does not condense on the inner wall of the transparent outer cover 6 even after long-term use. In that way, the transparent outer cover 6 can continuously remain transparent to show the swirling fog and mist.

The characteristics of the mist-releasing openings 41 disclosed in embodiments of the present invention are distributed on the inclined or vertical surfaces 42, 44 of the water tank cover 4. In other words, these mist-releasing openings 41 form a certain angle with the horizontal plane. When the mist passes through the mist-releasing openings 41, the small water droplets formed by the condensation of part of the mist will not block the mist-releasing openings 41. Compared with mist-releasing openings that are parallel to the horizontal plane, the mist-releasing openings 41 involved in the present invention can keep the amount of mist stable and maintain the effect of swirling mist for a longer period of time, and thus provide users a visually pleasing experience.

| Reference numerals: | |
|---|---|
| 1. Bottom shell; | 43. Periphery of water tank cover; |
| 2. Fan; | 44. Inner vertical surface; |
| 3. Water tank; | 5. Ultrasonic atomizing plate; |
| 31. Inner air outlet; | 6. Transparent outer cover; |
| 32. Air-releasing opening; | 61. Mist outlet; |
| 33. Rim or flange; | 7. Cavity. |

-continued

| Reference numerals: |
|---|
| 4. Water tank cover; |
| 41. Mist-releasing opening; |
| 42. Inclined surface/Outer vertical surface; |

The above embodiments are merely described as preferred embodiments of the present disclosure, but not intended to limit the scope of the present disclosure. Any variations and modifications of the technical solutions of the present disclosure made by people of ordinary skill in the art without departing from the design spirit of the present disclosure shall fall in the protection scope defined by claims of the present disclosure.

What is claimed is:

1. An air-release opening, disposed on a rim extending around a middle or a lower periphery of a water tank of an ultrasonic atomizer, the air-release opening comprising:

an upper exit and a depth running through a thickness of the rim; and a pair of opposing sidewalls bounding the air-release opening through the depth, wherein one or both of the opposing sidewalls are entirely or partly inclined.

2. The air-release opening according to claim 1, wherein the air-release opening is disposed on the rim such that a center longitudinal axis (L) of the air-release opening is located at an angle (a) away from a radial line (R) of the rim that passes through a center point of the air-release opening, wherein the center longitudinal axis is angled in a direction corresponding with a direction of incline of the opposing sidewalls.

3. The air-release opening according to claim 2, wherein the angle (a) ranges from 10 to 60 degrees.

4. The air-release opening according to claim 1, wherein the opposing sidewalls of the air-release opening, form an incline in a clockwise direction such that airflow emitted from the upper exit travels in the clockwise direction.

5. The air-release opening according to claim 1, wherein the opposing sidewalls of the air-release opening, form an incline in a counterclockwise direction such that airflow emitted from the upper exit travels in the counterclockwise direction.

6. The air-release opening according to claim 2, wherein the angle (a) controls airflow emitted from the upper exit to spiral and centrally converge.

7. The air-release opening according to claim 1, wherein a shape of the air-release opening is selected from the group consisting of: polygonal, circular and oval.

8. The air-release opening according to claim 1, wherein the ultrasonic atomizer further comprises a mist-release opening, disposed at a periphery of an upper part of the water tank or at a periphery of a water tank cover of the ultrasonic atomizer, wherein a plane of an exit side of the mist-release opening is non-parallel to a horizontal plane of the ultrasonic atomizer.

9. The air-release opening according to claim 8, wherein the plane of the exit side of the mist-release opening and the horizontal plane, form an angle greater than zero degrees.

10. The air-release opening according to claim 8, wherein the plane of the exit side of the mist-release opening is situated at 90 degrees to the horizontal plane, such that the mist-release opening is vertically disposed.

11. The air-release opening according to claim 8, wherein the mist-release opening is disposed on a vertical surface extending outside an area of the periphery of the water tank cover.

12. The air-release opening according to claim 8, wherein the mist-release opening is disposed on a vertical surface located inward from an area of the periphery of the water tank cover.

13. The air-release opening according to claim 8, wherein a shape of the exit side of the mist-release opening is selected from the group consisting of: polygonal, circular and oval.

14. An ultrasonic atomizer comprising a plurality of air-release openings, each air-release opening according to claim 1.

15. An ultrasonic atomizer comprising a plurality of air-release openings, each air-release opening according to claim 2.

16. The ultrasonic atomizer according to claim 14, wherein the plurality of air-release openings are evenly arranged on the rim.

17. The ultrasonic atomizer according to claim 14, wherein the plurality of air-release openings are unevenly arranged on the rim.

18. The ultrasonic atomizer according to claim 14, further comprising one or more mist-release openings, disposed at a periphery of an upper part of the water tank or on a water tank cover, wherein a plane of an exit side of each of the one or more mist-release openings is non-parallel to a horizontal plane of the ultrasonic atomizer.

19. The ultrasonic atomizer according to claim 14, wherein the opposing sidewalls of each air-release opening form an incline in a clockwise direction, such that airflow emitted from the upper exit of each air-release opening travels in the clockwise direction.

20. The ultrasonic atomizer according to claim 14, wherein the opposing sidewalls of each air-release opening form an incline in a counterclockwise direction, such that airflow emitted from the upper exit of each air-release opening travels in the counterclockwise direction.

* * * * *